UNITED STATES PATENT OFFICE.

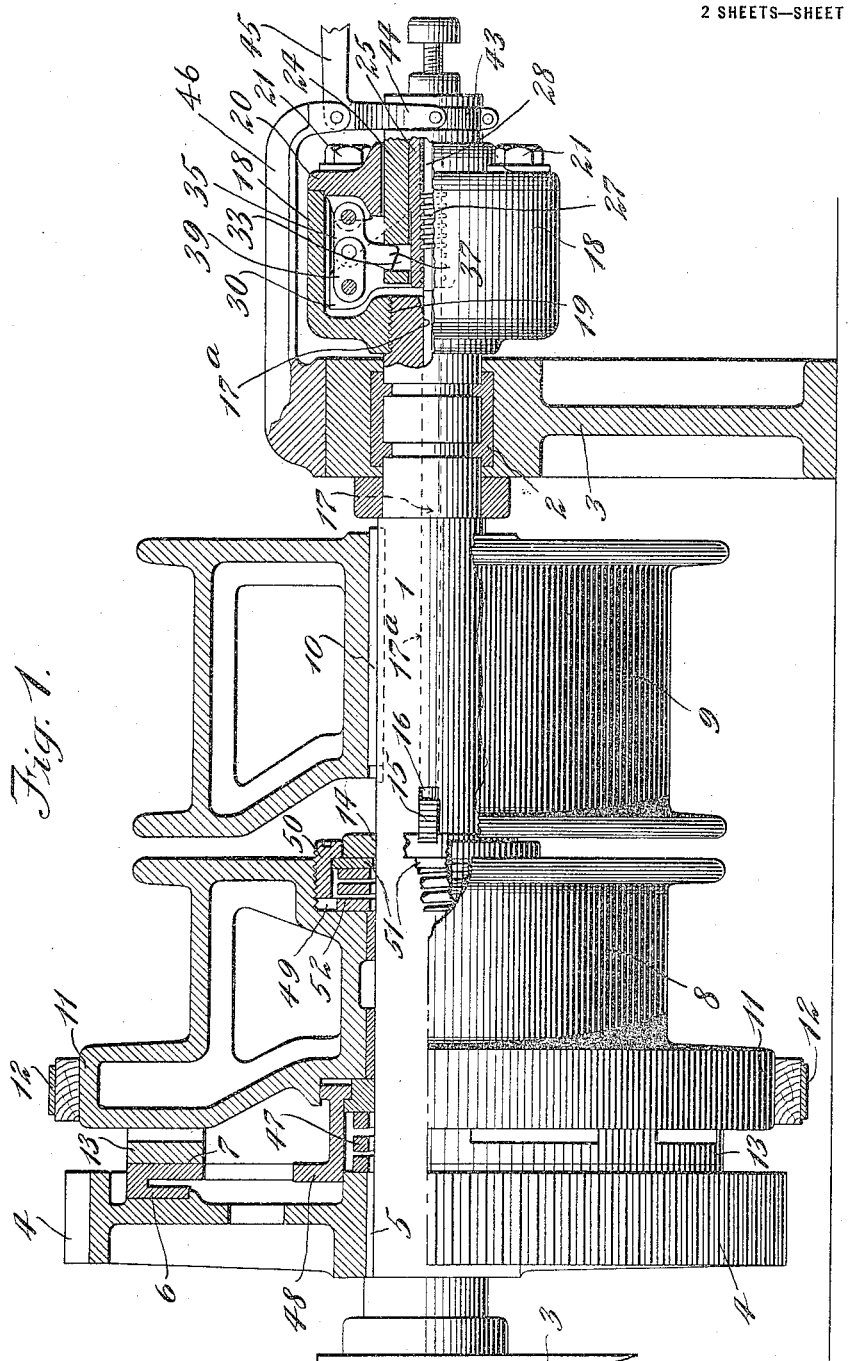

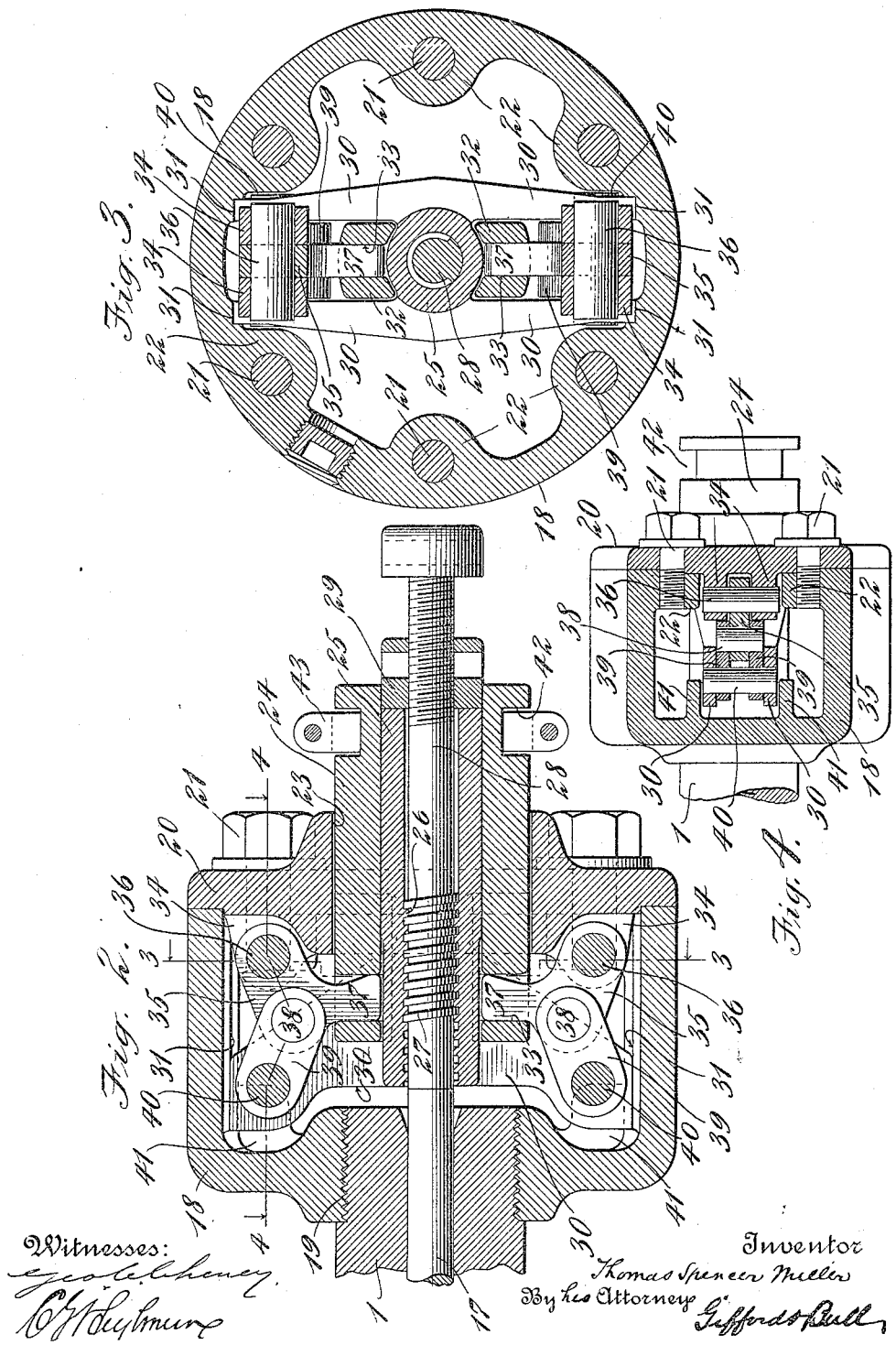

THOMAS SPENCER MILLER, OF SOUTH ORANGE, NEW JERSEY.

CLUTCH.

1,193,586.  Specification of Letters Patent.  Patented Aug. 8, 1916.

Application filed May 6, 1910. Serial No. 559,680.

*To all whom it may concern:*

Be it known that I, THOMAS SPENCER MILLER, a citizen of the United States, residing at South Orange, county of Essex, and State of New Jersey, have invented certain new and useful Improvements in Clutches, of which the following is a specification.

My invention relates broadly and generally to new and useful improvements in clutches, and more particularly to clutches for use in connection with rope winding drums of that type known as "slip drums" embodying a driving element to which the drum is frictionally connected, the frictional contact being sufficient to provide a proper driving connection between the parts under normal conditions, but permitting relative slipping movement between the driving element and drum when the drum is subjected to a dangerous overload, means being usually provided for placing the driving element and drum in proper driving frictional engagement and holding them in such relation.

The primary object of the present invention is to provide improved and simplified means for placing the driving and driven parts in frictional engagement, which means may be operated conveniently and expeditiously, and which will effectively hold the parts in proper frictional engagement after having been so placed.

The invention consists in the improvements to be fully described hereinafter and the novelty of which will be particularly pointed out and distinctly claimed.

I have fully and clearly illustrated my invention in the accompanying drawings to be taken as a part of this specification and wherein:—

Figure 1 is a view in elevation, partly in central longitudinal section, of a structure embodying my invention. Fig. 2 is an enlarged central longitudinal section through the thrust means. Fig. 3 is a section on the line 3—3 of Fig. 2. Fig. 4 is a section on the line 4—4 of Fig. 2.

Referring to the drawings by characters of reference, 1 designates a horizontally disposed shaft, the ends of which are mounted in bearings 2 located at the upper ends of suitable standards 3, 3. The construction of the standards and bearings is immaterial so long as they accomplish the functions for which they are employed.

Mounted on the shaft 1, adjacent one end thereof, is a driving element preferably consisting of a gear 4, adapted to be placed in mesh with a gear of a driving shaft (not shown) as is usual and well known in rope engine practice. This gear is keyed to the shaft to turn therewith as shown at 5 in Fig. 1, and said gear is provided with an annular friction ring 6, the friction face 7 of which is located in a plane at substantially right angles to the axis of rotation of the shaft.

Mounted on the shaft 1 may be two driven elements, shown in the form of drums 8, 9, the one farther from the driving element 1 being keyed to the shaft as shown at 10, and the drum 8 adjacent the driving element being mounted to turn freely relative to the shaft under conditions to be presently set forth and also being movable longitudinally of the shaft. The drum 8 may be provided with a brake flange 11 with which coöperates a band brake 12, but this feature forms no part of my present invention and in no way imposes limitations thereon. The drum 8 is provided with a friction ring 13 on the face toward the driving element, said ring having a friction face at right angles to the axis of rotation and adapted to contact with the friction face 7 on the driving element. It will be understood that the form of friction surfaces shown and described may be varied without in any wise affecting the scope of my invention, which does not depend on any particular form of slip friction connection between the driving and driven elements.

I will now proceed to describe the improved means for placing and maintaining the friction rings 6 and 13 in driving contact, which is accomplished by moving the drum, *i. e.*, the driven element 8 toward the driving element longitudinally of the shaft 1. Arranged in the space between the drums 8, 9, and engaging the drum 8 on the side away from the driving element 4 is a thrust collar 14 which is engaged by a cross piece 15 extending through a transverse slot 16 in the shaft 1, said cross piece 15 being engaged by a thrust rod or pin 17 extending through a longitudinal bore 17$^a$ in the shaft 1, and terminating adjacent the end thereof, as shown in Figs. 1 and 2. Means to be presently described is employed for exerting a thrust on this rod 17 for moving the collar 14 to in turn force the drum 8 toward the driving element 4, said means turning with the shaft and rod so that there are no relatively moving contacting parts to cause reduction of the parts by wear which would cause frequent adjustment in order to insure the desired degree of friction between the drum and driving element.

The means to which reference has just been made consists of a supporting member which may be in the form of a casing 18 rigidly mounted on the end of the shaft 1 to turn therewith, said casing being secured to the shaft by a threaded connection 19, if desired. The outer end of this casing is closed by a cap plate 20 which is detachably secured in place by bolts 21 let through apertures in said cap plate, and threaded into bosses 22 forming part of the casing. The cap plate 20 is formed with a central, preferably circular, opening 23, through which projects a hollow cylindrical actuating member 24, one end of which projects within the casing and the other outside the casing, said member being arranged for reciprocating movement within and through said opening, the wall of the opening being of sufficient area, as shown in Fig. 1, to provide a suitable guide and support for said member.

Slidably disposed within the bore of the member 24 is a tubular thrust member 25, the bore of which is threaded at 26 to receive threads 27 on an adjusting pin 28 extending through said bore and normally contacting at one end with the outer end of the pin 17. The pin 28 is adjustable longitudinally of the member 25 by virtue of the threaded connection therewith for a purpose to be presently set forth, by rotating the pin, the outer end of the latter being threaded and engaged by a lock nut 29 whereby the pin may be held in any position to which it is adjusted.

The thrust member 25 at one end projects within the casing 18 and is provided at said end with oppositely directed pairs of spaced radial arms 30, the outer ends of which engage and travel on suitable guides 31 on the inside wall of the casing and extending longitudinally thereof. The connection between these guides 31 and the arms 30 serve not only to guide the movements of the member 25, but also to form a connection between the said member and casing whereby the member 25 and the shaft 1 are caused to revolve together.

The inner end of the member 24 is cut away so as to project between each pair of arms 30 and forming oppositely disposed projections 32, in each of which is formed a recess 33. The back of the cap plate or the inner face thereof is formed on opposite sides of the opening therethrough with a pair of ears 34 between each of which a toggle link 35 is pivoted on a longitudinally removable pin 36, said links being each provided with a lateral projection 37 which project within the recesses 33 above described, the opposite ends of the links being pivoted by pins 38 to the ends of toggle links 39, the opposite ends of which project between the outer ends of the arms 30, and are pivoted thereto by removable pins 40. The removable pins 36 and 40 are held in place when the parts are assembled by the bolt boss 22 on one hand and by projections 41 on the casing between which said pins are arranged.

In normal released position, or in other words, that position to release the drum from the driving element, the parts assume the general relation shown in Fig. 2 in which the toggle levers or links are deflected inward at their joints, in which position the member 24 has been moved outwardly to relieve the rod 17 from the pressure of the pin 28. The parts being in the position shown in Fig. 2, any movement of the sleeve 24 into the casing will serve to spread the toggle links toward straight position, which operates through the connection between the toggles and the arms 30, to move the thrust element 25 and the pin 28 therein into engagement with the rod 17 to move the drum and complete the frictional engagement between the same and the driving element. The inward movement of the actuator member 24 is continued until the pivots of the toggle links are brought into longitudinal alinement, or dead centered, when said toggles serve as a lock to maintain the drum in close contact with the driving element 4.

Any suitable means may be supplied for manually reciprocating the actuator member 24 to either apply or relieve the friction, but I prefer to form the outer end of this member 24 with an annular groove 42 in which is fitted a non-rotatable collar 43 which is straddled by the arms 44 of a yoke carried by an operating lever 45 fulcrumed in a bracket 46 fixed to the standard 3. By operating this lever, it will be seen that the element 24 will be moved in one direction or the other to apply or relieve the friction as may be desired.

I will now proceed to describe the operation of my invention. When it is desired to place the friction elements 6 and 13 in contact to drive the drum 8 from the driving element 4, the operating lever 45 is manipulated to thrust the actuator element 24 into the casing which serves to straighten out the toggles to the position shown in Fig. 1. This movement of the toggles through their connection with the arms 30 operates to thrust the sleeve 25 inwardly moving with it the pin 28, the inner end of which engages the rod 17 and thrusts the same longitudinally of the shaft 1, and moves the drum toward the driving element to cause the engagement of the friction surfaces whereby the drum is driven. In applying the friction the lever 45 is moved until the pivot connections of the toggle links are dead-centered, in which position said toggles operate to hold the element 25, the pin carried thereby, and the thrust rod 17 at their innermost position, and the drum cannot be thrown out of friction except by the outward movement of the sleeve or actuator element to the right by the operation of the lever 45. The threaded connection between the pin 28 and the member 25 provides a convenient adjustment for regulating the degree of friction to be produced between the friction surfaces. If, for instance, the degree of friction should not be sufficient, it can be increased by turning the pin 28 to feed it toward the rod 17 which will result in the latter and the drum being moved a corresponding distance toward the driving element which will result, when the toggles are operated, to move the friction surfaces together with greater force. When it is desired to break the connection between the drum and the driving element, the operating lever is swung to move the actuator element 24 outward which breaks the toggle joints and moves the element 25 to relieve the pressure of the pin 28 on the rod 17. When the pressure exerted on the drum by the toggles is relieved, the drum is moved away from the driving element 4 by means of an expansive coil spring 47 arranged between the drum 8 and said driving element. The spring may be protected from dirt or other deleterious substances by means of a collar 48 surrounding the same, as shown in Fig. 1.

The invention as above described possesses numerous advantages over any thrust mechanism now in use of which I am aware, one of the chief advantages being the convenience and celerity with which the friction may be applied and released. Another advantage resides in the arrangement by means of which all of the parts embodying the thrust mechanism turn with the shaft and the drum so that there are no parts in contact rotating relative to each other and thereby causing undue wear. This advantage is particularly important in view of the fact that when once adjusted to provide the proper degree of friction there is no wear between the parts necessitating frequent adjustment such as has been required in the prior machines of which I am aware. It will also be apparent that the toggles constitute a power-multiplying means so that a powerful thrust can be exerted upon the clutch parts with comparatively little effort on the part of the operator. The provision of a toggle as the operating and holding means for the thrust mechanism affords another advantage in that the toggle, when dead-centered, forms a most effective lock for the thrust mechanism, and one which is not in any way affected by the rotary movement of the parts.

Means is provided in connection with the thrust mechanism just described whereby undue binding of the drum 8 against the driving member 4, in case the friction is applied too forcibly, or the drum should expand when slipping due to the heat generated by the friction, is obviated so that a slip of the drum relative to said driving element whenever said drum is subjected to excessive pull is assured. This means consists of a compensating device or means installed between the toggle thrust and the drum which will permit yielding movement of the drum away from the element 4 should the drum expand, which compensating device will now be described.

The end of the drum 8, opposite to that adjacent the gear 4 is formed with an annular recess 49 within which is adjustably threaded an annular shell 50, having an inwardly directed flange which sets over the thrust collar 14, a thrust washer 51 being inclosed within said shell and normally engaged by the said collar which projects within the shell. Within the chamber formed by the recess in the drum, the shell 50 and the washer 51 is an expansive helical spring 52 surrounding the shaft with its ends abutting the ends of the drum, and said washer, respectively. This shell 50 is adapted to be screwed into and out of the said recess to regulate the degree of compression of the spring 52, and is adjusted so as to compress the spring to exert an expansive pressure commensurate with the load to which the drum is to be subjected by the rope wound thereon. When the compression of the spring has been adjusted as required and the toggle thrust is operated to move the drum into frictional contact with the gear 4, it will be seen that a cushioned or yielding movement of the drum relative to the thrust is permissible, should the drum slip relative to the gear and the heat resulting from the friction between the parts be sufficient to expand the drum, this spring or cushion will permit the drum to expand lengthwise of the shaft without dangerously increasing the pressure of the drum against the gear. During this expansion the shell moves or slides over the thrust collar. By the provision of this cushion between the thrust and the drum practically all danger of the drum being locked to the gear through excessive pressure due to expansion or any other cause, such as careless adjustment of adjusting pin 28, is prevented. The spring 52 also serves to cushion any excessive thrust exerted by the toggles when setting the clutch which might be due to over-adjustment of the pin 28 toward the pin 17. When the spring is compressed by the shell it will be understood that it is not completely closed, as such a condition would destroy the purpose of employing the spring, as it would not yield but would be in the nature of a solid block.

While I have described the invention as being applicable to a friction drum, I do not desire to be limited to such a construction as the invention hereinafter claimed is applicable to other forms of clutch mechanism, regardless of their specific application, without departing from the spirit and scope of my invention.

Having thus described my invention, what I claim as new and desire to secure by Letters Patent is:—

1. In combination, a clutch, a shaft, a longitudinally movable thrust-pin, and a second thrust pin both supported by the shaft and rotatable therewith, a power multiplying clutch setting mechanism rotating with the shaft, and means for adjusting the relative position between the second thrust pin and the clutch-setting mechanism to regulate the degree of pressure exerted on the first mentioned thrust pin.

2. The combination of a shaft, a driving element and a driven element thereon having friction surfaces for connecting the same to drive the driven element, said driven element being movable lengthwise of the shaft to connect the friction surfaces, a reciprocable member operable to move the driven element, guiding means for said member, a sleeve adjustably engaging said member, toggles for operating the sleeve, and a reciprocating member for operating the toggle means.

3. The combination of a shaft, a driving element and a driven element thereon having friction surfaces for connecting the same to drive the driven element, said driven element being movable lengthwise of the shaft to connect the friction surfaces, a reciprocable member operable to move the driven element, a sleeve threaded to said member, toggle means for reciprocating the sleeve, and means for operating the toggle means.

4. In combination, a clutch, a shaft, a reciprocable member on the shaft for operating the clutch, toggle means connecting the shaft and said member, an operating sleeve reciprocably mounted on the shaft and surrounding said first mentioned reciprocable member, and engaging the toggles to operate same.

5. The combination of a shaft, a driving element and a driven element thereon having friction surfaces for connecting the same to drive the driven element, said driven element being movable lengthwise of the shaft to connect the friction surfaces, a support on the shaft, a reciprocable member on the support for moving the driven element, guiding means on the support for said member, toggle means connected to the support and member, an operating sleeve reciprocably mounted on the support and surrounding said first-mentioned reciprocable member, and a connection between the operating member and the toggles whereby the latter are operated.

6. The combination of a shaft, a driving element and a driven element thereon having friction surfaces for connecting the same to drive the driven element, said driven element being movable lengthwise of the shaft to connect the friction surfaces, a support mounted on and rotating with the shaft and having guides, a thrust member for moving the driven element, a sleeve engaging the thrust member, said sleeve having projections engaging said guides, toggle means connecting the support and said projections, an operating sleeve surrounding said first-mentioned sleeve and engaging the toggle to operate the same.

7. The combination of a shaft, a driving element and a driven element thereon having friction surfaces for connecting the same to drive the driven element, said driven element being movable lengthwise of the shaft to connect the friction surfaces, a support mounted on and rotating with the shaft and having guides, a thrust member for moving the driven element, a sleeve threaded to the thrust member and having projections engaging said guides, toggles connecting the support and said projections, and an operating sleeve surrounding said first-mentioned sleeve and engaging the toggles to operate the same.

8. The combination of a shaft, a driving element and a driven element thereon, having friction surfaces for connecting the same to drive the driven element, said driven element being movable lengthwise of thte shaft to connect the friction surfaces, a casing mounted on and turning with the shaft and having guides, and an apertured cap plate, a thrust member, a sleeve engaging the thrust member and having projections engaging the guide, an operating sleeve concentric therewith, said sleeves moving through the aperture in the cap plate, toggles connecting said projections and the cap plate and projections on the toggles seated in recesses in the operating sleeve.

9. In a structure of the character described, a driving member and a driven member having friction clutch surfaces adapted to be set by longitudinal movement of one of said members, an annular element adjustably threaded into one of said members, a spring adjustable between said annular element and member by the adjustment of said annular element, and a thrust device acting on the spring and having a limited clutch-setting movement.

10. In a structure of the character described, a driving member and a driven member having friction surfaces adapted to be set by longitudinal movement of one of said members, thrust means having a limited movement, a spring interposed between the movable member and the thrust means, and an annular shell adjustably engaging the movable member and operable on the spring to regulate the force thereof.

11. In a structure of the character described, a shaft, a driving member on the shaft, a driven element movable longitudinally of the shaft to engage the driving member, a recess in the end of the driven element, a shell adjustably threaded into the recess and having an over-hanging flange, a spring compressible between the flange and the drum and located in said recess, and thrust means acting on the spring to move the driven element into engagement with the driving member, said thrust means having a limited clutch-setting movement.

12. In combination, a clutch, a shaft, a longitudinally movable thrust pin for setting said clutch, a second thrust pin adapted to engage said first-named pin, both said pins being supported by the shaft and rotatable therewith, a power multiplying clutch-setting mechanism rotating with the shaft and acting on said second pin, a spring between said first pin and the clutch, and means for regulating the force of the spring and adapted to fix a desired force for successive clutch-setting operations.

13. In combination, a clutch, a shaft, a longitudinally movable thrust pin for setting said clutch, a second thrust pin adapted to engage said first-named pin, both said pins being supported by the shaft and rotatable therewith, a power multiplying clutch-setting mechanism rotating with the shaft and acting on said second pin, an expansive clutch-setting spring between the first-named pin and the clutch, and adjustable means for compressing the spring to regulate the expansive force thereof.

14. In combination, a clutch, a shaft, a longitudinally movable thrust pin, a second thrust pin, both supported by the shaft and rotatable therewith, a toggle clutch-setting mechanism rotating with the shaft, and means for adjusting the relative position between the second thrust pin and said toggle clutch-setting mechanism to regulate the degree of pressure exerted on the first-mentioned thrust pin.

15. In combination, a clutch, a shaft, a longitudinally movable thrust pin and a second thrust pin, both supported by the shaft and rotatable therewith, and a power multiplying clutch-setting mechanism rotating with the shaft, said second thrust pin having a threaded connection with said clutch-setting mechanism whereby said second pin is adjustable toward and away from the first-named thrust pin.

16. In combination, a clutch, a shaft, a longitudinally movable thrust pin, a member movable toward and away from said longitudinally movable thrust pin, a second thrust pin in longitudinal alinement with the first-named pin, and having a threaded connection with said member, and toggle thrust means for reciprocating said member to move the second pin toward and away from the first pin.

17. In combination, a clutch, a shaft, a longitudinally movable thrust pin for setting the clutch, a second thrust pin adapted to engage said first-named clutch pin, both said pins being supported by the shaft and rotatable therewith, a toggle clutch-setting mechanism rotating with the shaft and having an adjustable connection with said second pin, and a spring acting against a clutch surface to oppose the setting movement of said toggle mechanism.

18. In combination, a clutch, a shaft, a longitudinally movable thrust pin for setting the clutch, a second thrust pin adapted to engage said first-named clutch pin, both said pins being supported by the shaft and rotatable therewith, a toggle clutch-setting mechanism rotating with the shaft and having an adjustable connection with said second pin, and a spring opposing the setting movement of said toggle mechanism and exerting its force expansively against said first-named pin and one of the clutch members.

In testimony whereof I have hereunto signed my name in the presence of two subscribing witnesses.

THOMAS SPENCER MILLER.

Witnesses:
HARRY J. F. SMITH,
ERNEST PULSFORD.

Copies of this patent may be obtained for five cents each, by addressing the "Commissioner of Patents, Washington, D. C."

It is hereby certified that in Letters Patent No. 1,193,586, granted August 8, 1916, upon the application of Thomas Spencer Miller, of South Orange, New Jersey, for an improvement in "Clutches," errors appear in the printed specification requiring correction as follows: Page 1, line 97, after the word "drum" insert the reference-numeral *8;* same page, line 98, strike out the reference-numeral "8;" and that the said Letters Patent should be read with these corrections therein that the same may conform to the record of the case in the Patent Office.

Signed and sealed this 24th day of October, A. D., 1916.

[SEAL.]
F. W. H. CLAY,
*Acting Commissioner of Patents.*